United States Patent

Wittig et al.

[11] Patent Number: 6,064,547
[45] Date of Patent: May 16, 2000

[54] DAMPED DISK SEPARATOR

[75] Inventors: Larry E. Wittig, Lexington; Stanislaw Dobosz, Shrewsbury, both of Mass.

[73] Assignee: Quantum Corporation, Milpitas, Calif.

[21] Appl. No.: 09/153,440

[22] Filed: Sep. 15, 1998

[51] Int. Cl.[7] ..................................................... G11B 17/02
[52] U.S. Cl. ........................................................ 360/98.08
[58] Field of Search .......................................... 360/98.08

[56] References Cited

U.S. PATENT DOCUMENTS

| | | |
|---|---|---|
| 4,764,828 | 8/1988 | Gollbach . |
| 4,945,432 | 7/1990 | Matsudaira et al. . |
| 5,422,768 | 6/1995 | Roehling et al. . |
| 5,436,775 | 7/1995 | Ishimatsu . |
| 5,590,004 | 12/1996 | Boutaghou . |
| 5,644,451 | 7/1997 | Chan et al. . |
| 5,663,851 | 9/1997 | Jeong et al. . |

FOREIGN PATENT DOCUMENTS 3816-975-A1  5/1988  Germany .

OTHER PUBLICATIONS

McAllister, Jeff, Disk Flutter: Causes and Potential Cures; *Data Storage*, May/Jun. 1997.

McAllister, Jeffrey S. , The Effect of Platter Resonances on Track Misregistration in Disk Drives; *Sound and Vibration*; pp. 24–28; Jan. 1996.

Huang, E. E. and Lieu, D.K., Reduction of Precision Spindle Vibration by Radial Shear–Layer Damping, Department of Mechanical Engineering, University of California, Berkeley (16 pages).

*Primary Examiner*—Robert S. Tupper
*Attorney, Agent, or Firm*—Steven G. Roeder

[57] ABSTRACT

A disk separator for a disk assembly of a disk drive is provided herein. The disk assembly includes a plurality of storage disks which are spaced apart on a spindle by a plurality of the disk separators. As provided herein, each disk separator includes a disk spacer and a pair of disk dampers. The disk spacer is rigid and includes a first section which extends between adjacent storage disks for maintaining the storage disks accurately spaced apart on the spindle. Each disk damper is positioned between one of the storage disks and a second section of the disk spacer for dampening the level of vibration in the storage disks. The reduced vibration level decreases the level of mis-registration which occurs during operation of the disk drive and allows for the use of high rotational speed, high density, storage disks.

21 Claims, 3 Drawing Sheets

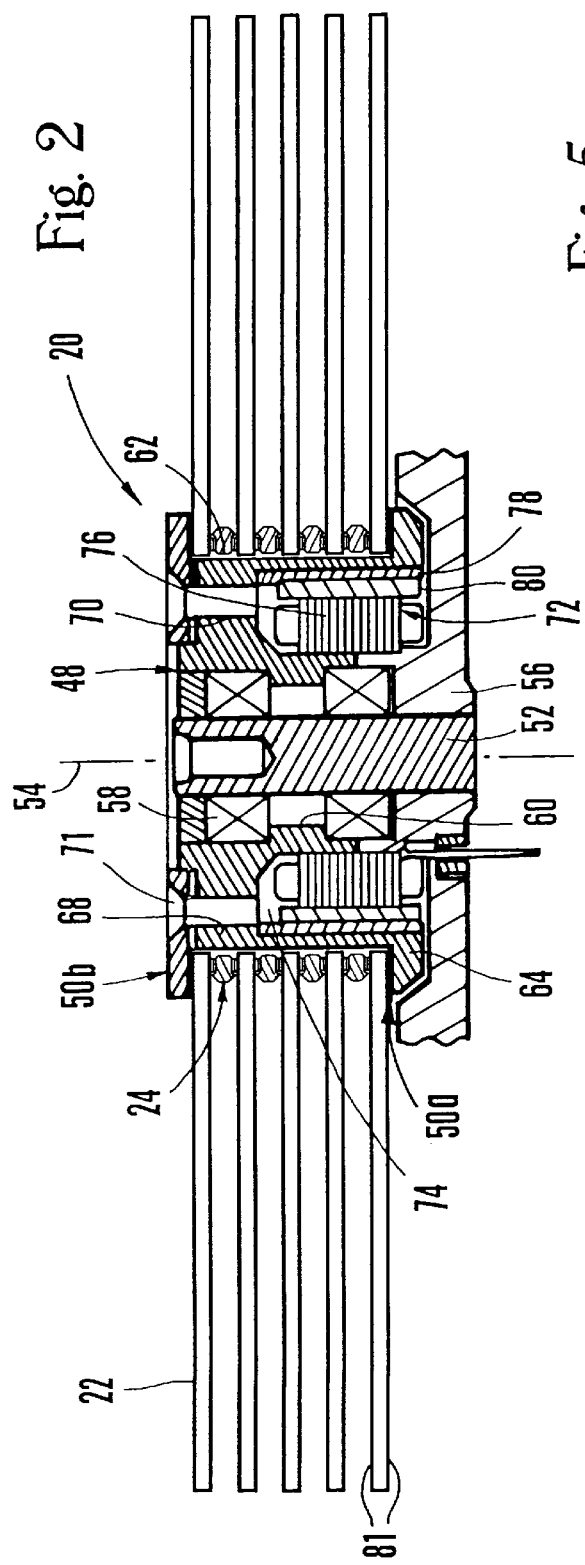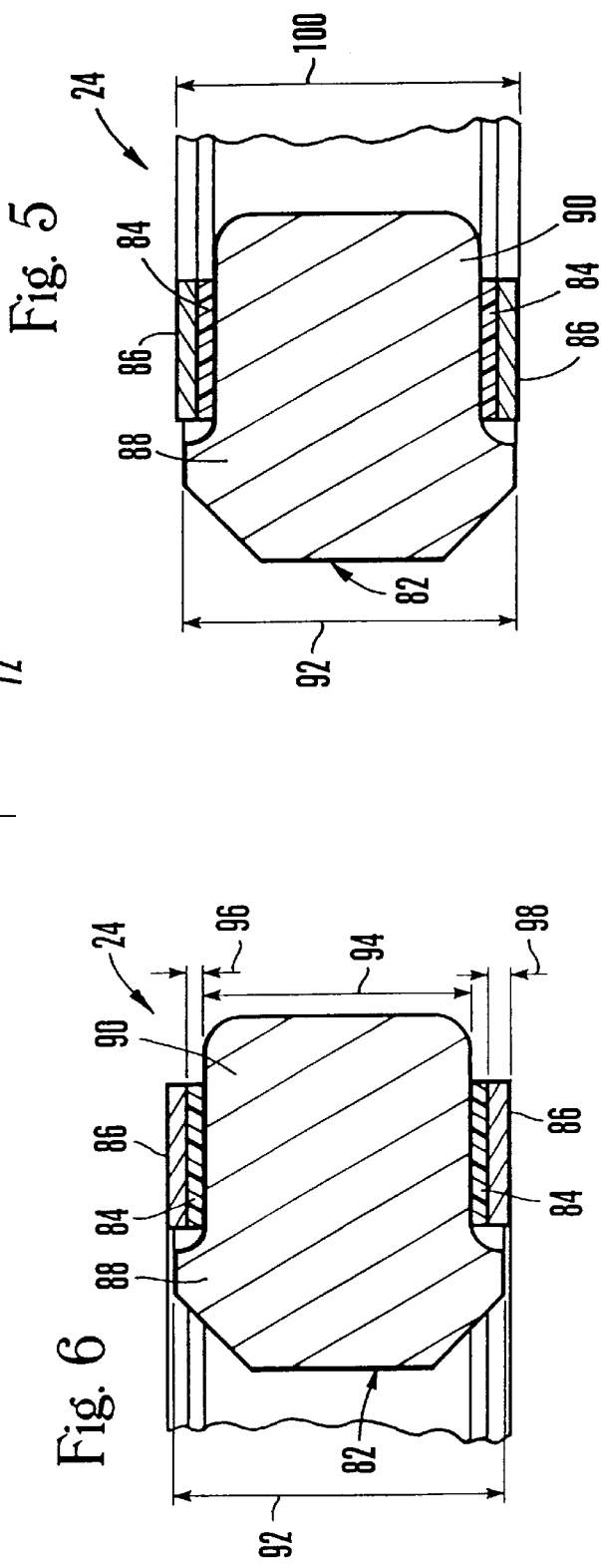

DAMPED DISK SEPARATOR

FIELD OF THE INVENTION

The present invention relates generally to disk drives for storing data. More specifically, the present invention relates to a disk separator for dampening vibration in rotating storage disks of a disk drive.

BACKGROUND

Disk drives are widely used in computers and data processing systems for storing information. These disk drives commonly use magnetic storage disks to store data in digital form. In order to obtain higher storage capacities, disk drives have evolved from utilizing a single rotating, storage disk, to utilizing a plurality of spaced apart, rotating, storage disks.

Each storage disk typically includes a data storage surface on each side of the storage disk. These storage surfaces are divided into a plurality of narrow, annular, concentric regions of different radii, commonly referred to as "tracks." Typically, an actuator assembly is used for precisely positioning a data transducer proximate the appropriate track on the storage disk to transfer information to and from the storage disk.

The need for increased storage capacity and compact construction of the disk drive has led to the use of disks having increased track density, i.e., more tracks per inch. With these systems, the accurate and stable positioning of the data transducer proximate the appropriate track is critical to the accurate transfer and/or retrieval of information from the rotating storage disks.

As is well known in the art, the rotating storage disks are excited by internal and external vibration of the disk drive. This vibration causes axial motion in the rotating disks which is transferred to the data transducers. This can lead to errors or delays in the transfer of data caused by the inaccurate positioning of the data transducer relative to the tracks on the rotating disks. This is commonly referred to as "track mis-registration."

Additionally, the need to rapidly access information has led to disk drives having storage disks which rotated at higher speeds. Presently, disk drives having disks which rotate at approximately 7,200 RPM and higher are available. Unfortunately, a significant portion of the internal vibration can be attributed to windage effect on the rotating disks. Thus, higher rotational speeds of the storage disks often result in increased levels of vibration of the rotating disks and increased occurrences of track mis-registration.

One attempt to solve this problem includes changing the design of each storage disk to reduce the amplitude of the vibration. For example, prototype storage disks have been made which utilize a pair of disk shaped aluminum substrates which are separated by an annular shaped viscous material. However, with this type of design, the distance between the disks fluctuates significantly with temperature changes.

Another attempt to solve this problem includes positioning an viscoelastic ring in series with a rigid spacer between adjacent disks. However, this attempt has also proven to be unsuccessful because compression in the viscoelastic ring allows for movement of the storage disks. This leads to track mis-registration.

In light of the above, it is an object of the present invention to provide a disk assembly for a disk drive having reduced levels of vibration. Another object of the present invention is to provide a more stable and accurate disk drive. Still another object of the present invention is to provide a disk drive which utilizes a plurality of high speed, high density storage disks.

SUMMARY

The present invention is directed to a disk separator for a disk assembly of a disk drive which satisfies these objectives. As described in detail below, the disk separator includes a disk spacer and a pair of disk dampers. The disk spacer accurately maintains the distance between adjacent storage disks, while the disk damper dampens the vibration in the storage disks. The reduced vibration of the storage disks allows for more accurate and stable positioning of data transducers proximate the storage disks. This leads to more accurate transferal of data to and from the storage disks and less track mis-registration.

The disk spacer is substantially rigid to accurately maintain the two (2) storage disks spaced apart on the spindle, while the disk damper is substantially viscoelastic. Typically, the disk spacer and the disk damper are substantially annular, and substantially encircle the spindle, and are substantially concentric to maintain the balance of the disk assembly. In the embodiments illustrated herein, the disk spacer includes a first section and a second section. The first section extends between adjacent storage disks to accurately maintain the storage disks spaced apart a fixed distance on the spindle. Each disk damper is positioned between one of the storage disks and the second section of the disk spacer. Preferably, each disk separator includes a pair of damper covers. Each damper cover is positioned between one of the disk dampers and one of the storage disks to protect the storage disk from the viscoelastic disk damper.

Preferably, the combination of the second section of the disk spacer, the disk dampers, and the damper covers has a combination height which is larger than a first section height of the first section of the disk spacer. This is preferred so that each disk damper is under a compressive load to dampen the vibration of the storage disks. Typically, the combination height is between approximately 0.003 millimeters to 0.2 millimeters and more preferably between approximately 0.05 millimeters and 0.1 millimeters larger than the first section height.

The disk separator provided herein is particularly suited for disk drives having a plurality of spaced apart disks which rotate at greater than approximately 7,000 RPM. Further, the disk separator is particularly suited for disk drives with storage disks having a relatively high track density, i.e., greater than approximately 10,000 tracks per inch.

The present invention is also directed to a method for damping the level of vibration in first and second, rotating storage disks. The method includes the steps of: (i) accurately maintaining the storage disks spaced apart with a disk spacer having a substantially rigid first section which extends between the adjacent sides of the storage disks; and (ii) dampening vibration in the storage disks with a substantially viscoelastic disk damper which is positioned between a second section of the disk spacer and the first storage disk.

Importantly, the unique design of the disk separator minimizes the vibration of rotating storage disks in a disk drive. The result is a more efficient, stable and accurate disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is a cross-sectional view of a disk assembly having features of the present invention;

FIG. 5 is an enlarged cross-sectional view taken on line 5 in FIG. 4; and

FIG. 6 is a cross-sectional view of a portion of a second embodiment of the disk separator having features of the present invention.

DESCRIPTION

Figure 1:
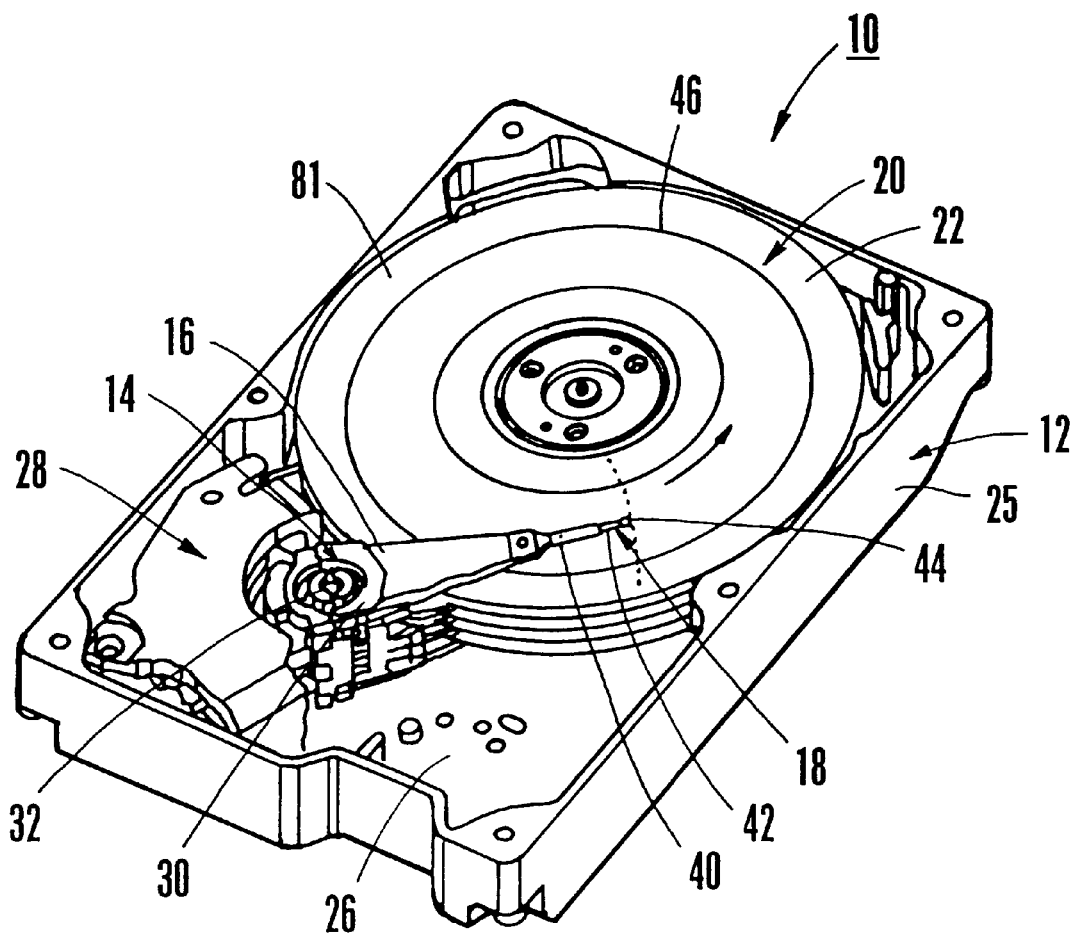
FIG. 1 is a perspective view of a disk drive having features of the present invention, a top cover from the disk drive has been removed for clarity.
Figure 3:
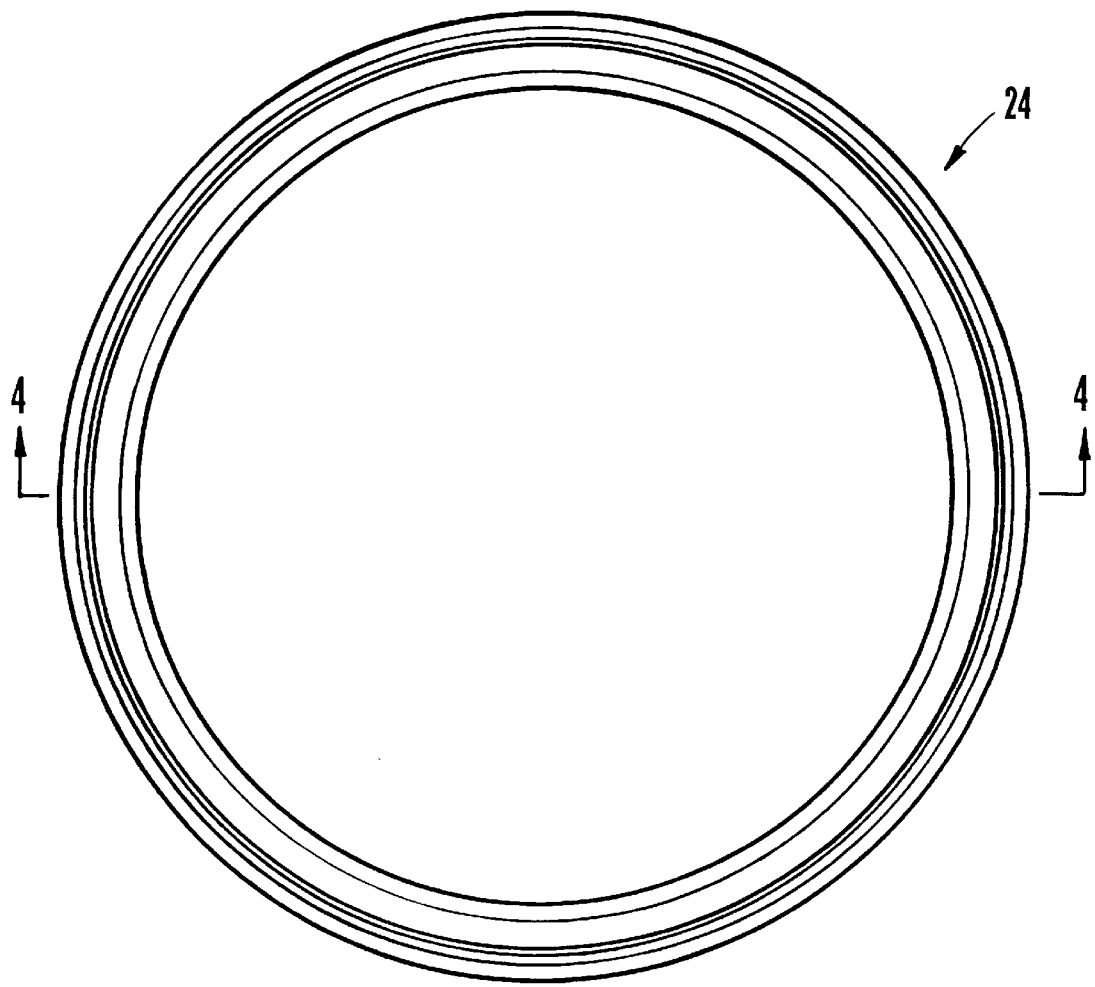
FIG. 3 is a top plan view of a first embodiment of a disk separator having features of the present invention.
Figure 4:
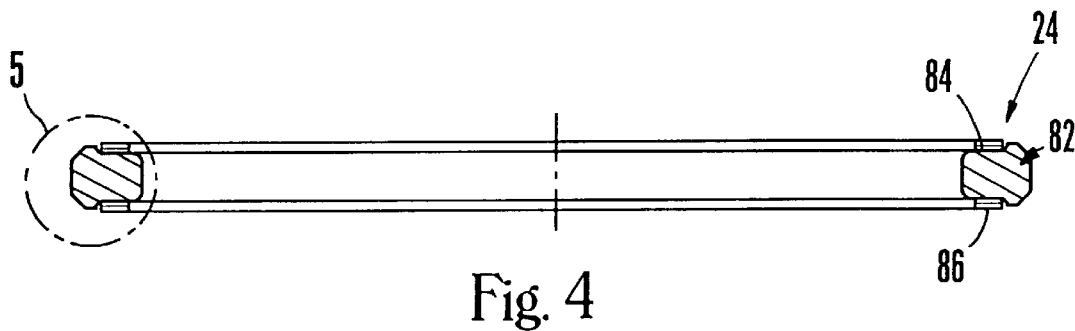
FIG. 4 is a cross-sectional view of the disk separation of FIG. 3 taken on line 4—4.

Referring initially to FIG. 1, a disk drive 10 according to the present invention includes: (i) a drive housing 12; (ii) an actuator assembly 14 which includes a plurality of actuator arms 16; (iii) a plurality of transducer assemblies 18; and (iv) a disk assembly 20 which includes a plurality of rotating storage disks 22 which are spaced apart by disk separators 24 (not shown in FIG. 1). As provided in detail below, the disk separators 24 dampen the vibration in the rotating storage disks 22. This allows for more accurate positioning of the transducer assemblies 18 and more accurate data transfer to and from the storage disks 22.

A detailed description of the various components of a disk drive 10 is provided in U.S. application Ser. No. 08/868,190, entitled "Disk Drive Disk Damper" filed on Jun. 3, 1997, and U.S. Pat. No. 5,208,712, issued to Hatch et al., both of which are assigned to Quantum Corporation, the assignee of the present invention. The contents of U.S. application Ser. No. 08/868,190, and U.S. Pat. No. 5,208,712, are incorporated herein by reference. Accordingly, only the structural aspects of a disk drive 10 which are particularly significant to the present invention are provided herein.

The drive housing 12 retains the various components of the disk drive 10. The drive housing 12, shown in FIG. 1, includes four (4) side walls 25 and a base 26. A typical drive housing 12 also includes a cover (not shown for clarity) which is spaced apart from the base 26 by the side walls 25. The drive housing 12 is typically installed in the case of the computer (not shown) or a word processor (not shown).

The actuator assembly 14 includes the plurality of actuator arms 16 for positioning the transducer assemblies 18 proximate the storage disks 22 and a voice coil motor 28. In the embodiment shown in FIG. 1, the actuator arms 16 are attached to and cantilever from an actuator hub 30. In this embodiment, the actuator hub 30 mounts to an actuator shaft 32 and rotates relative to the actuator shaft 32 on an actuator bearing assembly (not shown).

The voice coil motor 28 precisely moves the actuator arms 16 and the transducer assemblies 18 relative to the storage disks 22. The voice coil motor 28 can be implemented in a number of alternate ways known by those skilled in the art. For example, the voice coil motor 28 can be a rotary voice coil motor or a linear voice coil motor. In the embodiment shown in FIG. 1, the voice coil motor 28 is a rotary voice coil motor. In this embodiment, activation of the voice coil motor 28 rotates the actuator hub 30 and moves the actuator arms 16 relative to the storage disks 22.

The transducer assemblies 18 transfer or transmit information between the computer or word processor and the storage disks 22. In the embodiment provided herein, each transducer assembly 18 includes a load beam 40, a flexure 42, and a data transducer 44. The load beam 40 attaches the flexure 42 and the data transducer 44 to the actuator arm 16. Typically, each load beam 40 is flexible in a direction perpendicular to the storage disk 22 and acts as a spring for supporting the data transducer 44. Each flexure 42 is used to attach one (1) of the data transducers 44 to one (1) of the load beams 40. Typically, each flexure 42 includes a plurality of conductive flexure traces (not shown) which are electrically connected to the data transducer 44.

Each data transducer 44 interacts with one (1) of the storage disks 22 to access or transfer information to the storage disk 22. For a magnetic storage disk 22, the data transducer 44 is commonly referred to as a read/write head. To read or access data from a magnetic storage disk 22, the data transducer 44 produces electronic read signals in response to the passage of tracks 46 on the storage disk 22. To write or transfer data to the disk 22, the data transducer 44 generates a magnetic field which is capable of polarizing the desired region of the storage disk 22.

It is anticipated that the present device can be utilized for data transducers 44 other than read/write heads for a magnetic storage disk 22. For example, the present invention may be used with an electro-optical transducer for accessing data stored on optical storage disks.

Referring now to FIG. 2, the disk assembly 20 includes a spindle 48, the plurality of storage disks 22 and the plurality of disk separators 24. As detailed herein, the disk separators 24 provide dimensional stability to the spaced apart storage disks 22 and reduce vibrational amplitude in the storage disks 22.

The design of the spindle 48 varies according to the design of the other components of the disk drive 10. As shown in FIG. 2, the spindle 48 includes a first stop 50a and a second stop 50b which secure the storage disks 22 and disk separators 24 to the spindle 48. The spindle 48 is mounted to a spindle shaft 52 which is secured to a base plate 56. The spindle 48 rotates on a disk axis 54 relative to the spindle shaft 52 on a spindle bearing assembly 58.

The shape of the spindle 48 can vary according to the design of the other components of the disk drive 10. For example, the spindle 48, shown in FIG. 2, is somewhat annular ring shaped and includes a spindle inner surface 60 for receiving the spindle bearing assembly 58 and a spindle outer surface 62 for receiving the storage disks 22 and the disk separators 24. A lower end 64 of the spindle 48 includes a circumferential outwardly protruding lip which forms the first stop 50a for inhibiting downward movement of the storage disks 22. An upper end of the spindle 68 includes a plurality of internally threaded surfaces 70 for attaching the second stop 50b to the spindle 48.

In the embodiment illustrated in FIG. 2, the second stop 50b is disk shaped and is secured to the spindle 48 with a plurality of spindle bolts 71. The spindle bolts 71 insert into the internally threaded surfaces 70 and draw the second stop 50b downward to clamp the storage disks 22 and the disk separators 24 together.

The spindle 48, the storage disks 22, the disk separators 24, the first stop 50a, and the second stop 50b are rotated about the disk axis 54 at a predetermined angular velocity by a spindle motor 72. In the embodiment shown in FIG. 2, the spindle motor 72 is positioned in a spindle cavity 74 which is formed between the spindle 48 and the base plate 56. The spindle motor 72 includes a stator 76 which is secured to the base plate 56, a back iron 78, and a magnet 80 which is secured to the spindle 48.

The rotation rate of the spindle motor 72 varies according to the design of the disk drive 10. Presently, disk drives 10 having storage disks 22 rotate at an angular velocity of about 7,200 RPM. However, the present invention is particularly suited for use with disk drives 10 having storage disks 22 which rotate at approximately 7,200 RPM or greater.

The storage disks 22 store data in a form that can be subsequently retrieved if necessary. Magnetic storage disks 22 are commonly used to store data in digital form. Alternately, for example, each storage disk 22 can be optical or magneto-optical. For conservation of space, each storage disk 22 preferably includes a data storage surface on each side 81 of the storage disk 22. These data storage surfaces are typically divided into a plurality of narrow annular regions of different radii, commonly referred to as "tracks" 46. The track 46, illustrated in FIG. 1, is representative of one of the plurality of tracks 46 which are located on each side 81 of the storage disk 22.

Importantly, because the disk separators 24 reduce the vibration level in the disk assembly 20 and allow for more stable and accurate positioning of the transducer assemblies 18, the track densities of the disks 22 can be relatively high. Preferably, for conservation of space, each disk 22 has a track density of approximately 8,500 tracks per inch or greater.

Each storage disk 22 includes an annular disk opening which is sized to fit over the spindle outer surface 62. The storage disks 22 are manufactured by ways known to those skilled in the art. For high speed, high track density storage disks 22, surface flatness and finish of each storage disk 22 is particularly important to the dynamic stability of the disk drive 10 and the interaction between each data transducer 44 and each track 46.

The embodiment illustrated in FIG. 2 includes five (5) spaced apart storage disks 22 which are attached to the spindle 48. Those skilled in the art will recognize that the present invention is useful for disk drives 10 having any number of spaced apart storage disks 22. Adjacent storage disks 22 are spaced apart a sufficient distance so that at least one (1) data transducer 44 can be positioned proximate each of the sides 81 of adjacent storage disks 22. Typically, consecutive disks 22 are spaced apart between about one millimeter to three millimeters (1 mm–3 mm).

Each disk separator 24 encircles the spindle 48 and properly maintains the distance between adjacent storage disks 22. The number of the disk separators 24 varies according to the number of disks 22. For example, the disk assembly 20 illustrated in FIG. 2, includes five (5) storage disks 22 and four (4) disk separators 24. Alternately, for example, a disk drive 10 which includes seven (7) storage disks 22 can utilize six (6) disk separators 24.

As illustrated in FIGS. 2–6, each disk separator 24 includes a disk spacer 82, a pair of disk dampers 84, and a pair of damper covers 86 which are sized to encircle the spindle 48. The disk spacer 82 extends between adjacent storage disks 22 to accurately maintain adjacent disks 22 a fixed disk distance apart. The disk dampers 84 dampen vibration between adjacent disks 22, while the damper covers 86 protect the disks 22 from the disk dampers 84.

In the embodiments illustrated in the Figures, each disk spacer 82 is substantially annular or ring shaped. Further, each disk spacer 82 is substantially rigid and can be made from a number of materials such as aluminum, an aluminum alloy, or a magnesium alloy. As can best be seen with reference to FIGS. 5–6, each disk spacer 82 includes a first section 88 and a second section 90. The first section 88 supports the disks 22 properly spaced apart while the second section 90 supports the disk dampers 84. As shown in the Figures, the first section 88 has a first section height 92 which is greater than a second section height 94 of the second section 90.

The actual configuration of the disk spacer 82 can be varied. For example, in the embodiment shown in FIG. 5, the second section 90 is positioned on the inside of the first section 88. Alternately, as shown in FIG. 6, the first section 88 can be positioned on the inside of the second section 90.

In the embodiments illustrated herein, each of the disk dampers 84 is substantially annular or ring shaped and has a damper height 96. Each disk damper 84 is positioned between one of the disks 22 and the second section 90 of the disk spacer 82. Each disk damper 84 is viscoelastic and can be made from a number of viscoelastic materials. For example, suitable material for the disk damper 84 includes a viscoelastic material sold by 3M Corporation located in St. Paul, Minn. under the trade name "IDS-130."

In the embodiments illustrated herein, each damper cover 86 is also substantially annular or ring shaped and has a cover height 98. Each damper cover 86 is positioned between one of the disk dampers 84 and one of the disks 22 to protect the disk 22 from the disk damper 84. Each damper cover 86 may be made of a number of materials, including rigid materials such as aluminum, an aluminum alloy, or a magnesium alloy.

Typically, the disk separator 24 is sized so that consecutive disks 22 are spaced apart a fixed disk distance of between approximately one millimeter to three millimeters (1 mm–3 mm). Preferably, each disk separator 24 is designed so that a combination height 100 of the second section 90, two disk dampers 84, and two damper covers 86 are slightly larger than the first section height 92, so that the disk dampers 84 are initially partly compressed. Stated another way, the first section height 92 is less than a combination height 100 of the second section height 94, two times the damper height 96, and two times the cover height 98. The amount of compression can be varied to suit the needs of the disk drive 10. Typically, the combination height 100 is at least between approximately 0.003 millimeters to 0.2 millimeters larger than the first section height 92.

Preferably, the disk dampers 84, the damper covers 86, and the disk spacers 82 are secured together for ease of assembly of the disk assembly 20. This can be accomplished in a number of alternate ways. For example, the disk dampers 84 can be molded to the disk spacer 82 or the disk dampers 84 can be adhered with an adhesive to the disk spacer 82.

While the particular disk drive 10 and disk assembly 20 as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk separator adapted for separating two storage disks on a spindle of a disk drive, each storage disk having a pair of opposed sides, the disk separator comprising:

a disk spacer including a first section and a second section, the first section being adapted to extend between one of the sides of each of the two storage disks, the first section being substantially rigid to maintain the two storage disks spaced apart on the spindle;

a first disk damper adapted for being positioned intermediate one of the sides of one of the storage disks and the second section of the disk spacer, the first disk damper being substantially viscoelastic to dampen the level of vibration in the storage disks; and a first damper cover adapted to be positioned between the first disk damper and one of the sides of one of the storage disks for protecting the storage disks from the first disk damper.

2. The disk separator of claim 1 wherein the first disk damper is substantially annular and is adapted for substantially encircling the spindle, and the disk spacer is substantially annular and is adapted for substantially encircling the spindle.

3. The disk separator of claim 1 including a second disk damper adapted for being positioned intermediate one of the sides of one of the storage disks and the second section of the disk spacer for dampening the level of vibration in the storage disks.

4. A disk assembly including a spindle, two storage disks positioned on the spindle, and the disk separator of claim 3 positioned between the two storage disks on the spindle.

5. The disk separator of claim 3 including a second damper cover adapted to be positioned between the second disk damper and one of the sides of one of the storage disks.

6. A disk assembly including a spindle, two storage disks positioned on the spindle, and the disk separator of claim 5 positioned between the two storage disks on the spindle.

7. The disk separator of claim 5 wherein a combination height of the second section, the disk dampers, and the damper covers is larger than a first section height of the first section.

8. A disk assembly including a spindle, two storage disks positioned on the spindle, and the disk separator of claim 1 positioned between the two storage disks on the spindle.

9. A disk drive including the disk assembly of claim 8 and a drive housing having a spindle shaft; wherein the spindle is rotatably secured to the spindle shaft of the drive housing.

10. A disk drive comprising a drive housing having a spindle shaft, the disk assembly of claim 8 and a spindle motor; wherein the spindle is rotatable secured to spindle shaft of the drive housing and the spindle motor is adapted to selectively rotate the disk assembly at an angular velocity which is greater than approximately 7,000 RPM relative to the spindle shaft.

11. A disk assembly for a disk drive, the disk assembly comprising:

a spindle;

first and second storage disks positioned on the spindle, each storage disk having a pair of opposed sides;

an annular, disk separator encircling the spindle and maintaining the storage disks spaced apart on the spindle, the disk separator including (i) a substantially rigid disk spacer having a first section and a second section, the first section extending between one of the sides of each of the storage disks for maintaining the storage disks spaced apart a fixed disk distance on the spindle; and (ii) substantially viscoelastic, first and second disk dampers for dampening the level of vibration in the storage disks, the first disk damper being positioned between the first storage disk and the second section of the disk spacer and the second disk damper being positioned between the second storage disk and the second section of the disk spacer; and first and second damper covers, the first damper cover being positioned between the first storage disk and the first disk damper, the second damper cover being positioned between the second storage disk and the second disk damper.

12. A disk drive including the disk assembly of claim 11, and a drive housing having a spindle shaft; wherein the spindle is rotatable secured to the spindle shaft of the drive housing.

13. The disk assembly of claim 11 wherein a combination height of the second section, the disk dampers, and the damper covers is larger than a first section height of the first section.

14. A method for damping the vibration in first and second spaced apart storage disks on a spindle, each storage disk having two sides, the method comprising the steps of:

maintaining the storage disks spaced apart a fixed disk distance with a rigid disk spacer, the disk spacer having a first section and a second section, the first section extending between one of the sides of each of the storage disks;

dampening vibration in the storage disks with a substantially viscoelastic first disk damper which is positioned between the second section of the disk spacer and the first storage disk; and protecting the first storage disk with a first damper cover positioned between the first storage disk and the first disk damper.

15. The method of claim 14 including the step of protecting the first storage disk with a damper cover positioned between the first storage disk and the first disk damper.

16. The method of claim 14 wherein the step of dampening vibration includes the step of positioning a substantially viscoelastic second disk damper between the second section of the disk spacer and the second storage disk.

17. The method of claim 16 including the step of protecting the storage disks with a second damper cover, the second damper cover being positioned between the second storage disk and the second disk damper.

18. The method of claim 17 wherein a combination height of the second section, the disk dampers, and the damper covers is larger than a first section height of the first section.

19. A disk assembly for a disk drive, the disk assembly comprising:

a spindle;

first and second storage disks positioned on the spindle, each storage disk having a pair of opposed sides;

an annular, disk separator encircling the spindle and maintaining the storage disks spaced apart on the spindle, the disk separator including (i) a substantially rigid disk spacer having a first section and a second section, the first section extending between one of the sides of each of the storage disks for maintaining the storage disks spaced apart a fixed disk distance on the spindle; and (ii) first and second disk dampers for dampening the level of vibration in the storage disks, the first disk damper being positioned between the first storage disk and the second section of the disk spacer and the second disk damper being positioned between the second storage disk and the second section of the disk spacer; and first and second damper covers, the first damper cover being positioned between the first storage disk and the first disk damper, the second damper cover being positioned between the second storage disk and the second disk damper;

wherein a combination height of the second section, the disk dampers, and the damper covers is larger than a first section height of the first section.

20. The disk assembly of claim 19 wherein each disk damper is made of a substantially viscoelastic material.

21. A disk drive including the disk assembly of claim 19 and a drive housing having a spindle shaft; wherein the spindle is rotatably secured to the spindle shaft of the drive housing.

* * * * *